United States Patent
Nanbu

[19]

[11] Patent Number: 6,056,218
[45] Date of Patent: May 2, 2000

[54] FISHING REEL

[75] Inventor: Kazuya Nanbu, Saitama, Japan

[73] Assignee: Daiwa Seiko, Inc., Tokyo, Japan

[21] Appl. No.: 09/199,464

[22] Filed: Nov. 25, 1998

[30] Foreign Application Priority Data

Nov. 26, 1997 [JP] Japan ..................................... 9-324082

[51] Int. Cl.[7] .............................................. A01K 89/00
[52] U.S. Cl. ............................ 242/223; 33/708; 33/732
[58] Field of Search ................................ 242/223, 305; 33/706, 708, 732, 733

[56] References Cited

U.S. PATENT DOCUMENTS

| | | | |
|---|---|---|---|
| 4,697,758 | 10/1987 | Hirose et al. | 242/223 |
| 4,790,492 | 12/1988 | Atobe | 242/223 |
| 5,363,565 | 11/1994 | Kaneko | 242/223 X |
| 5,395,065 | 3/1995 | Hirose | 242/223 |
| 5,427,323 | 6/1995 | Kaneko et al. | 242/223 |
| 5,503,341 | 4/1996 | Kaneko et al. | 242/223 |
| 5,524,831 | 6/1996 | Carlson | 242/223 |
| 5,645,237 | 7/1997 | Kaneko | 242/223 X |
| 5,833,154 | 10/1998 | Kaneko | 242/223 |

FOREIGN PATENT DOCUMENTS

| | | |
|---|---|---|
| 63-3568 | 1/1988 | Japan . |
| 3-10859 | 3/1991 | Japan . |
| 3-28770 | 6/1991 | Japan . |
| 4-276510 | 10/1992 | Japan . |
| 5-103567 | 4/1993 | Japan . |
| 6-197672 | 7/1994 | Japan . |

*Primary Examiner*—Donald P. Walsh
*Assistant Examiner*—Emmanuel M. Marcelo
*Attorney, Agent, or Firm*—Liniak, Berenato, Longacre & White

[57] ABSTRACT

A fishing reel includes: a spool rotatably supported to a reel main body; rotation number detect element detecting the rotation number and rotation direction of the spool; a microcomputer measuring the length of a fishing line in accordance with the detected rotation number and displaying the measured fishing line length on a display device; and control element controlling the processing operation speed of the microcomputer according to a rotation state of the spool detected by the rotation number detect element.

4 Claims, 7 Drawing Sheets

FISHING REEL

BACKGROUND OF THE INVENTION

1. Field of the Invention

The present invention relates to a fishing reel including a fishing line length measuring device.

2. Description of the Related Art

In recent years, most of fishing reels include a fishing line length measuring device which, in accordance with the number of rotations of a spool detected by rotation number detect means, measures the length of a fishing line (that is, the amount of play-out of the fishing line and the amount of take-up of the fishing line) and displays the thus detected fishing line length on a display device; in particular, based on the information that is obtained from such fishing line length measuring device, the terminal tackles of the fishing reel can be swung down onto a given shelf position, or, in lure fishing, the carrying distance of the terminal tackles up to a certain fishing point can be confirmed.

Conventionally, the rotation number detect means includes a plurality of magnetic sensors respectively mounted on a reel main body and a single magnet which is mounted on the spool in such a manner as to correspond to the plurality of magnetic sensors; and, a microcomputer, which is incorporated in the fishing line length measuring device, not only inputs into its CPU a signal for judging the forward rotation or reversed rotation of the spool, which signal is obtained when the plurality of magnetic sensors are turned on/off by the magnet, to thereby judge whether the fishing line is played out or taken up, but also allows an up/down counter incorporated therein to measure a spool rotation pulse signal input from the magnetic sensors to thereby measure the fishing line length in accordance with the measured value of the spool rotation pulse signal.

By the way, generally, a fishing reel of a high-speed type that a spool is rotated at high speeds when a fishing line is played out as in lure fishing in which a fishing rod is strongly swung down to thereby set the terminal tackles onto a given fishing point; and, a fishing reel of a low-speed type that, as in boat fishing in which a fishing line is played out onto a given shelf in the sea from a fishing rod set on the side of a boat, a spool is rotated at a relatively low speed are applied. The number of rotations of the spool varies according to kinds of fishing, methods of fishing, and the like.

Also, in actual fishing, the rotation of the spool varies according to cases. For example, generally, when compared with the time when the fishing line is played out, the spool is rotated at considerably slower speed when the fishing line is taken up. In order to be able to detect the spool rotation number according to various conditions in actual fishing, in the conventional fishing line measuring device, the processing operation speed of the microcomputer is previously set at its design stage on the basis of the spool high-speed-rotation that can be assumed.

However, when the processing operation speed of the microcomputer is set on the basis of the high-speed rotation in the above-mentioned manner, the power consumption of the microcomputer is large and the life of the battery power source thereof is thereby inconveniently shortened. Also, in an actual fishing operation, the spool is not always rotated at a high speed. Therefore, when these conditions are taken into account, preferably, the processing operation speed of the microcomputer may be set properly according to the rotation conditions of the spool to thereby enhance the life of the battery power source of the microcomputer.

On the other hand, conventionally, there is disclosed in Japanese Utility Model Examined Publication No. 3-28770 of Heisei and Japanese Patent Unexamined Publication No. 6-197672 of Heisei a fishing reel in which, when the rotation number detect means is not in operation for a given period of time in an actual fishing operation, supply of power to the rotation number detect means is cut off or the operation of the display portion is stopped to thereby prevent the power consumption of the batter power source. However, in either of the two cited publications, the spool rotation speed in an actual fishing operation is not taken into consideration and thus there is still left a problem to be solved in the aspect of enhancement of the battery life.

SUMMARY OF THE INVENTION

The present invention aims at eliminating the above drawbacks found in the conventional fishing reels. Accordingly, it is an object of the invention to provide an improved fishing reel with a fishing line length measuring device in which the processing operation speed of a microcomputer is controlled according to the rotation conditions of a spool in an actual fishing operation to thereby be able to enhance the battery life.

In attaining the above object, according the first aspect of the invention, there is provided a fishing reel including: a spool rotatably supported to a reel main body; a rotation number detect unit detecting the rotation number and rotation direction of the spool; a microcomputer measuring the length of a fishing line in accordance with the detected rotation number and displaying the measured fishing line length on a display device; and a control unit controlling the processing operation speed of the microcomputer according to a rotation state of the spool detected by the rotation number detect unit.

Further, according to the second aspect of the invention, there is provided a fishing reel including: a spool rotatably supported to a reel main body; a rotation number detect unit detecting the rotation number of the spool, wherein the rotation number detect means comprises: a first detect unit having a magnet mounted on a rotary body rotatable in linking with the spool and a lead switch mounted on the reel main body in such a manner as to be located opposed to the magnet, and a second detect unit having the magnet and a hall element mounted on the reel main body in such a manner as to be located opposed to the magnet, and further wherein, when the rotation speed of the spool calculated on the basis of a measure value of the rotation number detect means exceeds a given value, power supply to the hall element is started to thereby actuate the second detect unit.

BRIEF DESCRIPTION OF THE DRAWINGS

Similar references characters denote corresponding features consistently throughout the attached figures. The preferred embodiments of this invention will be described in detail, with reference to the following figures, wherein.

DETAILED DESCRIPTION OF THE PREFERRED EMBODIMENTS

Now, description will be given below in detail of a preferred embodiment of a fishing reel according to the invention with reference to the accompanying drawings.

[First embodiment]

Figure 1:
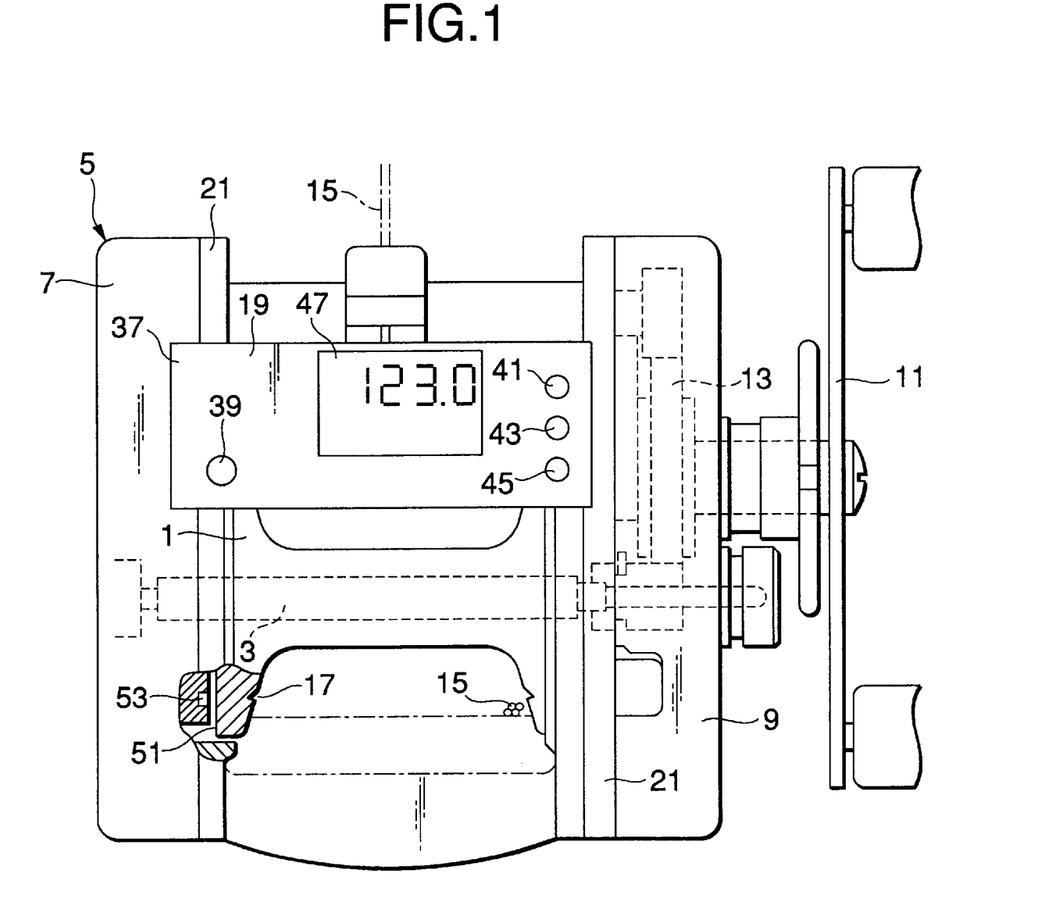
FIG. 1 is a partially cut-away plan view of a fishing reel according to a first embodiment of the invention.

FIG. 1 shows a fishing reel according to a first embodiment of the invention. In FIG. 1, reference character 1 designates a spool which is rotatably supported between the two side plates 7 and 9 of a reel main body 5 through a spool shaft 3, while 11 stands for a hand-operated handle; that is, a rotational force produced by the hand-operated handle 11 is transmitted to the spool shaft 3 by a power transmission mechanism 13 mounted within the side plate 9 so that a fishing line 15 can be taken up. On the inner periphery of the spool 1, there is disposed with a regulated winding diameter level 17 having a diameter set smaller than the maximum line winding diameter of the fishing line 15, in particular, substantially one half of the maximum line winding diameter. The regulated winding diameter level 17 is cut in an annular manner with the spool shaft 3 as a center thereof.

In addition, in the drawings, reference character 19 stands for a flat-box-shaped control case which is mounted integrally on the frame 21 of the reel main body 5 and is disposed in front of the upper portion of the spool 1.

Figure 2:
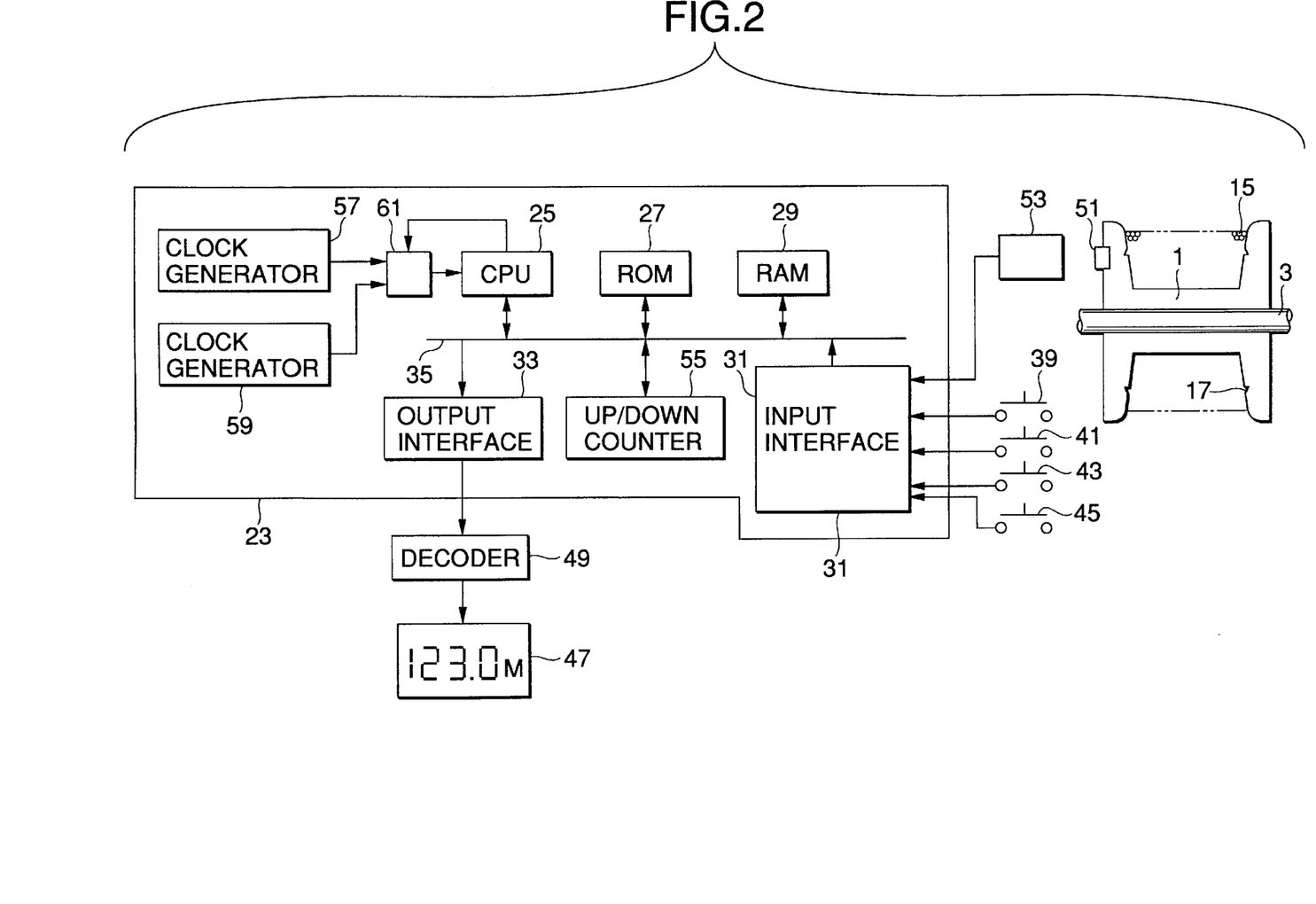
FIG. 2 is a control block diagram for measuring the length of a fishing line of the first embodiment.

In the interior portion of the control case 19, as shown in FIG. 2, there is incorporated a microcomputer 23 which is used to control a fishing line length operation, a fishing line display operation, and a data writing operation. The microcomputer 23 includes a CPU 25 which controls and manages a program memory, a data memory and an input/output device to thereby execute various operations and transfer processings necessary to deal with jobs given thereto, a ROM 27 which stores therein operation processing programs, fishing line calculation equations, a plurality of basic data corresponding to combinations of the spool shapes and the kinds of the fishing lines (both of which will be discussed later), and the like, a RAM 29 for storing therein data such as the operation results obtained in the CPU 25 and the like, and input and output interfaces 31 and 33; and, these components are respectively connected to the CPU 25 through a bus 35.

To the input interface 31, there are connected not only an on/off switch 39 which is mounted on an operation panel 37 disposed on the upper surface of the control case 19 and can be used to operate the microcomputer 23, but also a mode switching switch 41, a data setting switch 43, a reset switch 45 and the like; and, on the other hand, to the output interface 33, there is connected through a decoder 49 a digital display device 47 which is provided on the operation panel 37. And, as will be discussed later, on the present digital display device 47, an operation value obtained by the CPU 25 is to be displayed as the length of the fishing line 15.

Further, in FIG. 1, reference character 51 designates a single magnet which is mounted on one side surface of the spool 1, and 53 stands for a plurality of lead switches which are respectively mounted on the frame 21 in such a manner that they are located opposed to the rotation orbit of the magnet 51. The lead switches 53 are respectively connected to the input interface 31 of the microcomputer 23.

The microcomputer 23 not only takes judgment signals, which are output from the lead switches 53 correspondingly to the forward- and reversed-rotation of the spool 1, into the CPU 25 thereof through the input interface 31 to thereby be able to check the rotation direction of the spool 1, but also allows a built-in up/down counter 55 to measure the rotation pulse signal of the spool 1 input therein from the lead switches 53 and, based on the measured value, executes the operation of the fishing line calculation equation stored in the ROM 27 to thereby measure the length of the fishing line.

Figure 3:
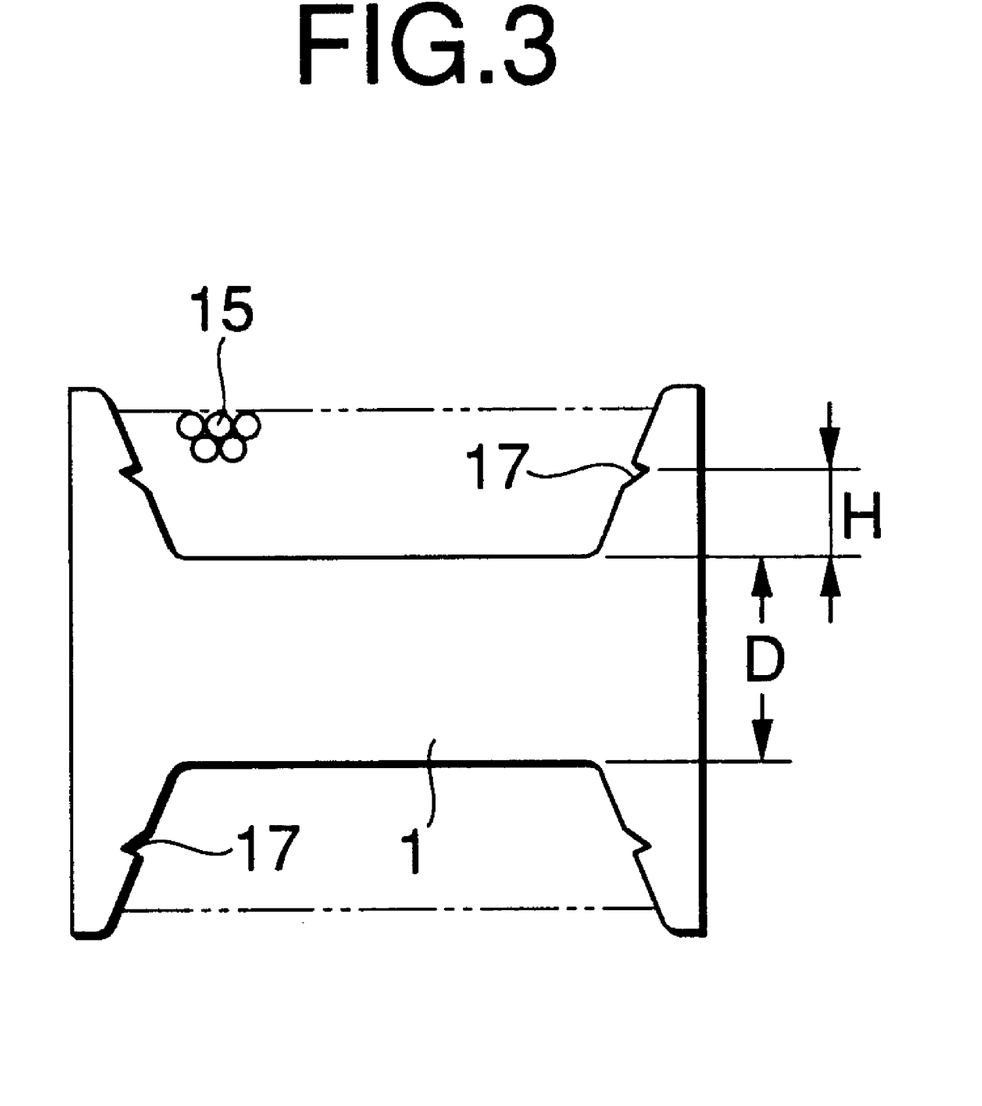
FIG. 3 is a front view of a spool of the first embodiment.

In the ROM 27 of the microcomputer 23, similarly to a fishing line measuring device which is disclosed in Japanese Patent Unexamined Publication No. 5-103567 of Heisei, as shown in FIG. 3, there are previously stored, as constants which respectively correspond to the shape of the spool, the bottom diameter D of the spool 1 and the groove depth H thereof extending up to the regulated winding diameter level 17.

In the input mode of the microcomputer 23, based on the total rotation number N of the spool 1 when the fishing line 15 is taken up to the regulated winding diameter level 17, the total rotation number Ne of the spool 1 when the fishing line 15 is taken up to the very end, and the above-mentioned constants D and H, constants d and e corresponding to the kind of the fishing line are found according to the following equations: that is, $$d = -\pi H/N$$

$$e = \pi(D + 2H \, Ne/N)$$

And, from the thus obtained constants d and e, the fishing line calculation equation stored in the ROM 27 is executed in the following manner: that is, $$L = d \, Na^2 + e \, Na \qquad (1)$$

After then, in the fishing line length measuring mode thereof, the CPU 25 executes the operation of the fishing line calculation equation (1) based on the actual rotation number Na of the spool 1 measured to thereby measure the length of the fishing line. The present embodiment according to the invention not only has a similar structure to the above-described conventional structure but also has features as follows.

That is, as previously described, when the spool rotation number is detected to thereby measure the length of the fishing line, in the conventional structure, in order to be able to detect the spool rotation number according to various conditions in an actual fishing operation, the processing operation speed of the microcomputer is previously set at its design stage on the basis of the spool high-speed rotation that can be assumed. However, when the processing operation speed of the microcomputer is set on the basis of the high-speed rotation in the above-mentioned manner, the power consumption of the microcomputer is large and the life of the battery source thereof is thereby inconveniently shortened.

Therefore, as shown in FIG. 2, the microcomputer 23 further incorporates therein a clock generator 57 for generating a clock having a frequency which is similar to the conventional clock frequency and can be dealt with by the microcomputer 23 in the high-speed rotation of the spool 1, and a clock generator 59 for generating a clock having a frequency lower than the above clock frequency: and, the following program is loaded into the ROM 27 of the microcomputer 23: that is, when, in accordance with a signal from the lead switch 53, the CPU 25 detects the rotation of the spool 1 in the fishing line take-up direction thereof, then the CPU 25 selects and uses through a switch circuit 61, out of the two clock generators 57 and 59, the clock generator 59 capable of generating a clock having a lower frequency; and, on the other hand, when the CPU 25 detects the rotation of the spool 1 in the fishing line play-out direction thereof, the CPU 25 uses the clock generator 57 capable of generating a clock having a high frequency.

Accordingly, since the clock generator 59 capable of generating a clock having a lower frequency is used when the spool 1 is rotated in the fishing line take-up direction, the processing operation speed of the microcomputer 23 in the take-up operation of the fishing line 15 is made slower than in the play-out operation of the fishing line 15.

Figure 4:
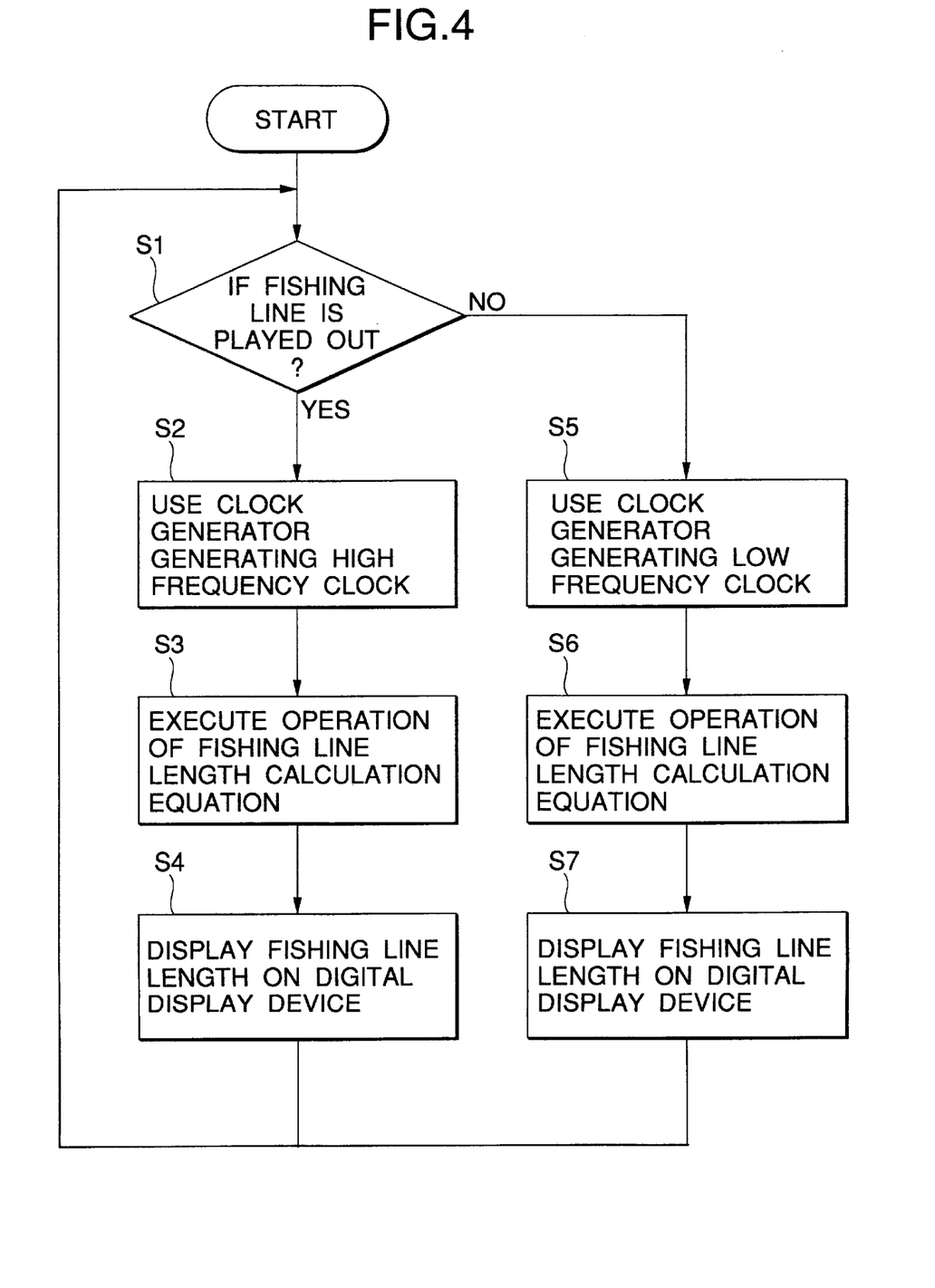
FIG. 4 is a flow chart for measuring the length of the fishing line of the first embodiment.

Since the present embodiment is structured in this manner, similarly to the fishing line measuring device disclosed in Japanese Patent Unexamined Publication No. 5-103567 of Heisei, in the input mode of the microcomputer 23, based on the total rotation number N of the spool 1 when the fishing line 15 is taken up to the regulated winding diameter level 17, the total rotation number Ne of the spool 1 when the fishing line 15 is taken up to the very end, and the above-mentioned constants D, H, the constants d and e are found and the fishing line calculation equation (1) is thereby decided; and, after then, if the mode switching switch 41 is operated to thereby switch the microcomputer 23 into the fishing line length measuring mode, then the CPU 25 thereafter executes the operation of the fishing line calculation equation (1) based on the actual rotation number Na of the spool 1. In particular, according to the present embodiment, if the microcomputer 23 is switched into the fishing line length measuring mode, then a program shown in FIG. 4 is started.

That is, if the microcomputer 23 is switched into the fishing line length measuring mode, then, at first, in Step S1, in accordance with the judgment signal for the forward- or reversed rotation of the spool 1 which is output from the lead switch 53, it is checked whether the fishing line 15 is played out or not.

If it is judged that the fishing line 15 is played out, then the CPU 25 selects through the switch circuit 61, out of the two clock generators 57 and 59, the clock generator 57 which generates a clock having a high frequency (Step S2). From that on, every operation cycle of the microcomputer 23, the CPU 25 takes in the count content Na of the up/down counter 55 to execute the operation of the fishing line length calculation equation (1) (Step S3), and the operation result is displayed on the digital display device 47 through the output interface 33 and decoder 49 (Step S4).

On the other hand, in Step S1, if it is judged that the fishing line 15 is taken up, then the spool 1 is rotated in the fishing line take-up direction as the fishing line 15 is taken up and, therefore, the CPU 25 selects through the switch circuit 61, out of the two clock generators 57 and 59, the clock generator 59 which generates a clock having a low frequency (Step S5). From that on, every operation cycle of the microcomputer 23, the CPU 25 takes in the count content Na of the up/down counter 55 to execute the operation of the fishing line length calculation equation (1) to thereby operate the taken-up fishing line length, that is, the length of the fishing line obtained by subtracting the taken-up fishing line length from the played-out fishing line length in Step S6, and the resultant fishing line is displayed on the digital display device 47 (Step S7).

After then, the processing returns back again to Step S1, and similar steps to the above are executed repeatedly until the fishing operation is ended.

As described above, according to the first embodiment, the two clock generators 57 and 59 capable of generating clocks having different frequencies are incorporated in the microcomputer 23, in the play-out operation of the fishing line 15 in which the spool 1 is most often rotated at a high speed, there is used the clock generator 57 which generates a clock having a high frequency, and, in the take-up operation of the fishing line 15 in which the spool 1 is rotated at a lower speed than in the fishing line take-up operation, there is used the clock generator 59 which generates a clock having a low frequency, so that the processing operation speed of the microcomputer 23 in the take-up operation of the fishing line 15 is made slower than in the fishing line 15 play-out operation. Thanks to this, when measuring the length of the fishing line, the spool rotation number can be detected at the processing operation speeds of the microcomputer 23 respectively suitable for the high-speed rotation of the spool 1 in the fishing line play-out operation and for the low-speed rotation of the spool 1 in the fishing line take-up operation. As a result of this, the power consumption of the microcomputer 23 can be controlled properly, which makes it possible to enhance the life of the batter power source to a great extent.

By the way, although, in the first embodiment, the two clock generators 57 and 59 capable of generating clocks having different frequencies are incorporated in the microcomputer 23, there can also be incorporated in the microcomputer a single clock generator which is capable of generating two kinds of operation clocks respectively having different frequencies, and, in the fishing line take-up operation, the clock frequency of the clock generator is controlled in such a manner as to be lower than in the fishing line play-out operation, so that the expected object of the invention can be achieved similarly to the first embodiment.

Moreover, the selection of the clock generators 57 and 59 capable of generating clocks having different frequencies may be conducted on the basis of the rotation speed of the spool 1.

As has been described heretofore in detail, according to the fishing reel of the first embodiment, when measuring the length of the fishing line, the spool rotation number can be detected at the processing operation speeds of the microcomputer respectively suitable for the high-speed rotation of the spool in the fishing line play-out operation and for the low-speed rotation of the spool in the fishing line take-up operation. Due to this, the power consumption of the microcomputer 23 can be controlled properly and thus the life of the batter power source can be enhanced to a great extent.

[Second embodiment]

Next, description will be given below in detail of a second embodiment with reference to the FIGS. 5–8. The fishing reel of the second embodiment has two detect units. The components designated by the same reference numerals as the first embodiment are configured in the same manner.

Figure 5:
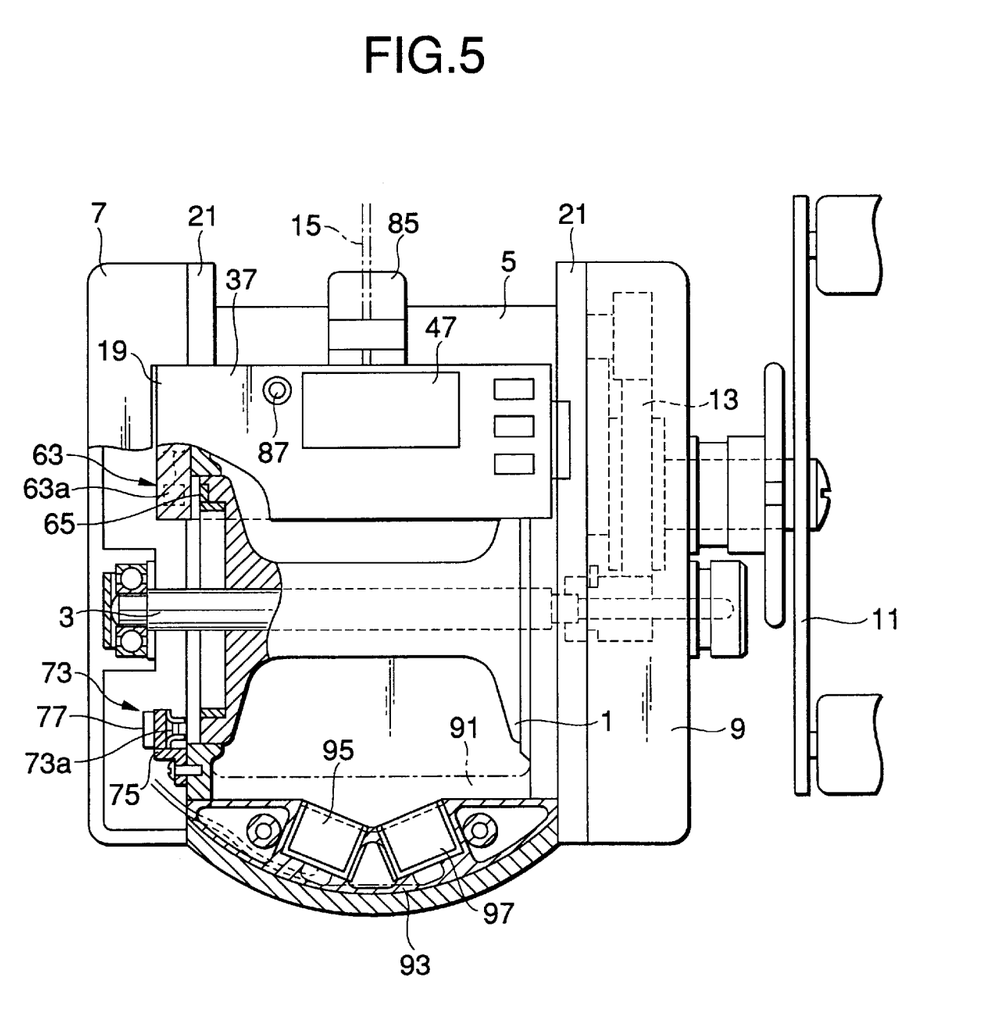
FIG. 5 is a partially cut-away plan view of a fishing reel according to a second embodiment of the invention.
Figure 6:
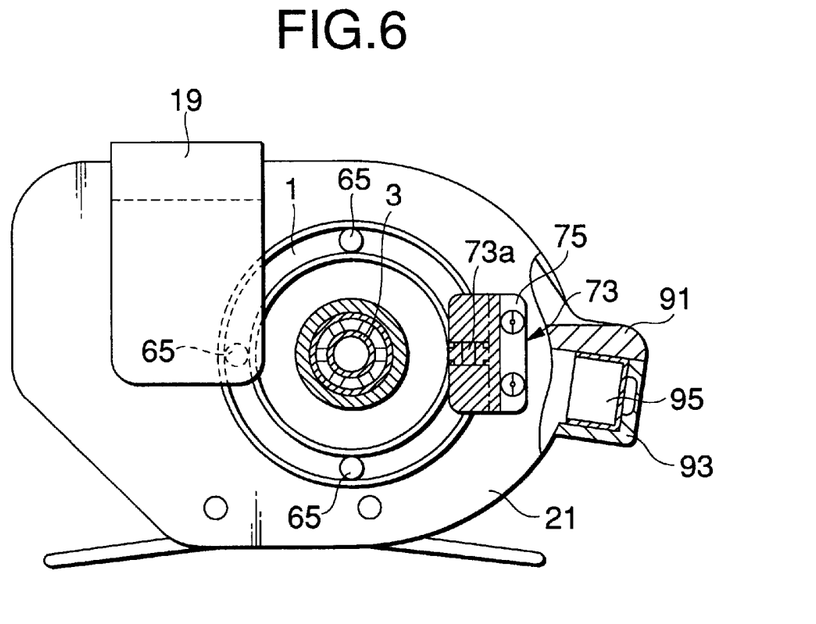
FIG. 6 is a sectional view of a fishing reel of the second embodiment showing a structure of a second detecting means.
Figure 8:
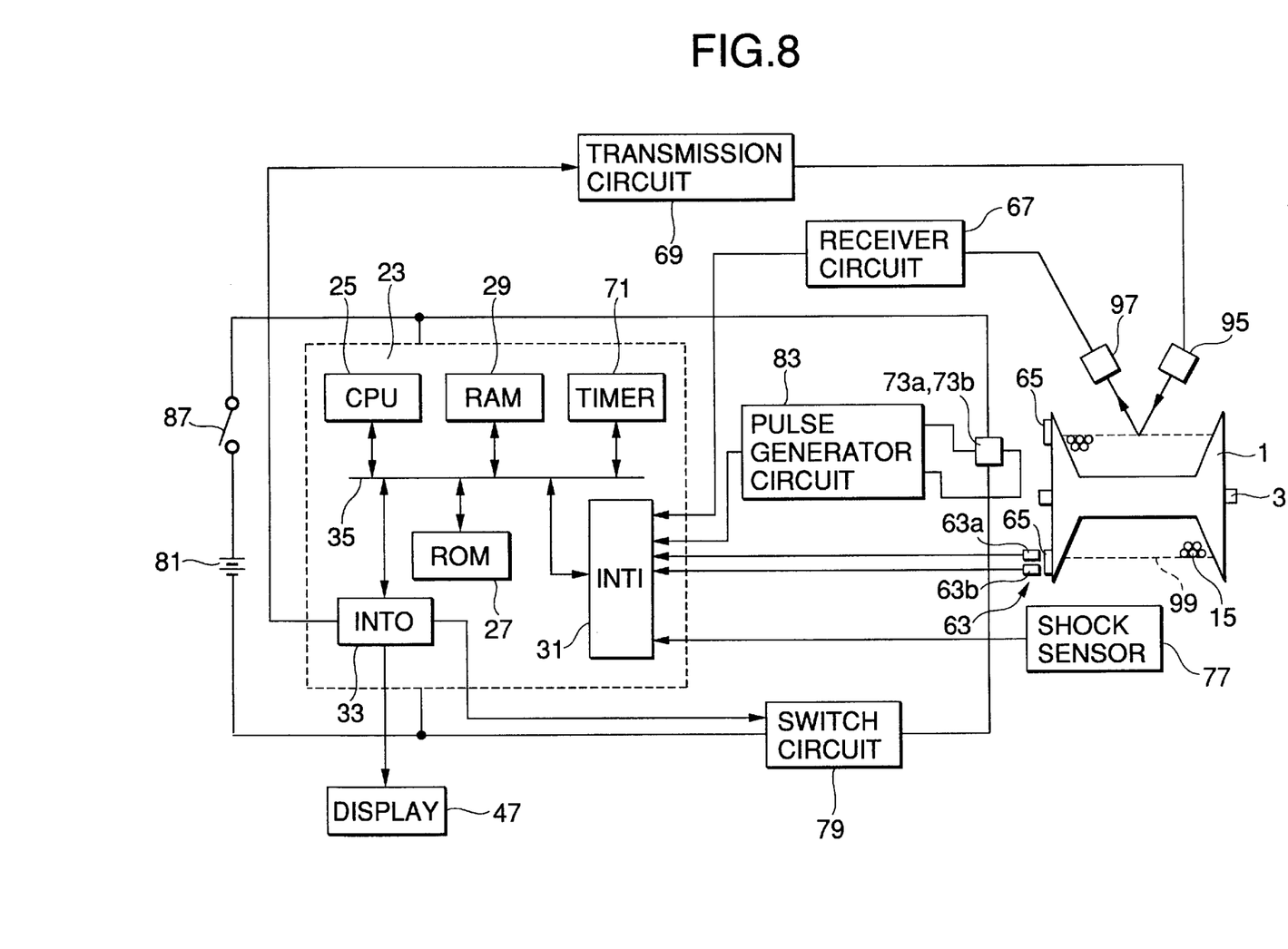
FIG. 8 is a control block diagram for measuring the length of a fishing line of the second embodiment.

In FIG. 8, reference character 63 designates a first detect unit for detecting the rotation number of the spool 1 and the rotation direction thereof. The first detect unit 63 includes a pair of lead switches 63a and 63b, and a plurality of magnets 65 which, as shown in FIGS. 5 and 6, are respectively fixed to the inner peripheral edge of the spool 1 in such a manner that they are located opposed to the pair of lead switches 63a and 63b. When one of the lead switches 63a and 63b is firstly turned on/off by the magnets 65, there is obtained a judgment signal for judging the forward or reversed rotation of the spool 1. When the thus obtained judgment signal is input through the input interface 57 into the CPU 25, then a built-in up/down counter can be set to either an up count state or a down count state.

Further, when a spool 1 rotation pulse obtained through the on/off operations of the lead switches 63a and 63b is input into the up/down counter through the input interface 31, then the present up/down counter can be made to count up or down.

To the input interface 31, there is connected an ultrasonic sensor 97 through a receiver circuit 67; and, to the output interface 33, there are connected an ultrasonic sensor 95 through a transmission circuit 69, and a display device 47. As shown in FIG. 5, the ultrasonic sensors 95 and 97 are received between a support member 35 disposed backward of the spool 1 and a sensor support body 37 provided downside of the support member 35. The ultrasonic sensor 95 functions as a transmission means hitting an ultrasonic wave on a winding surface 99 of the spool 1. The ultrasonic sensor 43 functions as a receiver means receiving a reflected wave of the ultrasonic wave reflected on the winding surface 99.

The rotation range that can be detected by the lead switches 63a and 63b for detecting the rotation number of the spool 1 is set less than or equal to about 8,000 rpm. That is, in boat fishing in which the terminal tackles are swung down or played out up to a given shelf position in the sea, since the rotation speed of the spool 1 is normally slow, in particular, in the range of 2000 to 3000 rpm, it is possible for the lead switches 63a and 63b to detect the rotation number of the spool 1.

However, when the double bearing type reel is operated to play out the terminal tackles, even in fishing with a rod and line on a boat in which the rotation number of the spool 1 is the smallest, the rotation speed of the spool 1 reaches 10,000 rpm. In this case, it is impossible for the lead switches 63a and 63b to detect the rotation number of the spool 1, so that the length of the fishing line cannot be measured accurately by the fishing line length measuring device.

Therefore, according to the second embodiment, in addition to a similar structure to the above-mentioned conventional structure, as shown in FIGS. 5 and 6, a pair of hall elements 73a and 73b (in FIGS. 5 and 6, only one of them, that is, only the hall element 73a is shown) are mounted on the reel frame body 21 through a bracket 75 in such a manner as to be located opposed to the magnets 65, so that the hall elements 73a, 73b and magnets 65 cooperate together in forming a second detect unit 73. At the same time, a shock sensor 77 for detecting the casting operation of an angler is mounted on the bracket 75 and, in accordance with the a detect signal output from the shock sensor 77 in the casting operation, power supply to the hall elements 73a and 73b is started to thereby be able to actuate the second detect unit 73.

Figure 7:
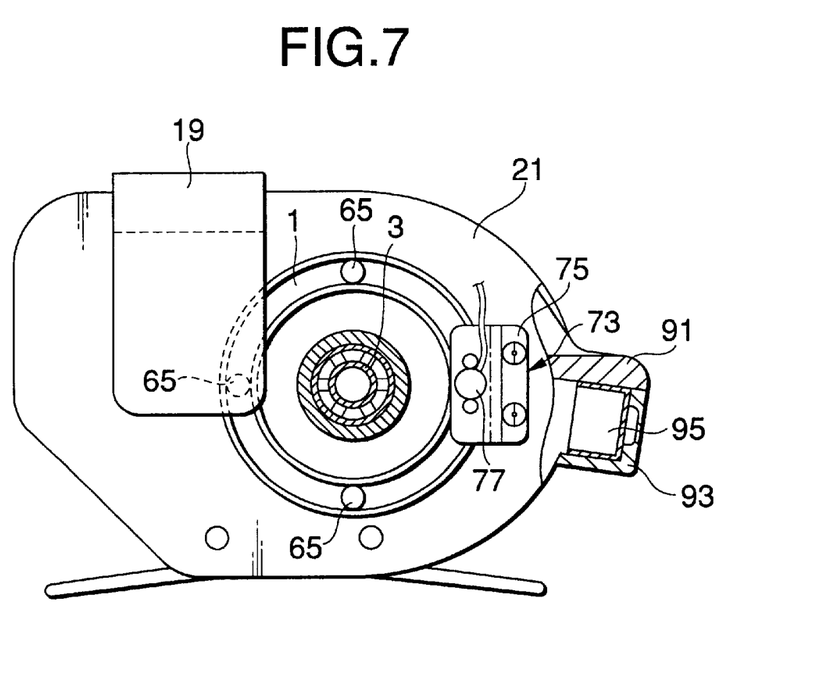
FIG. 7 is a sectional view of a fishing reel of the second embodiment showing a mounting structure of a shock sensor.

The shock sensor 77 is composed of, for example, a lead switch, a magnet and a spring. As the shock sensor 77, there are available a conventionally known shock sensor in which the magnet is moved due to an acceleration caused by the casting operation to thereby operate the lead switch, and a conventionally known shock sensor in which one side of a bimorph cell, which is formed by bonding together two pieces of piezoelectric ceramics, is fixed and, when, in the casting operation, the leading end of the bimorph cell is vibrated to thereby generate a voltage, the thus generated voltage is detected.

Further, when a set acceleration, which allows the spool 1 to rotate with a rotation number exceeding a given value (8000 rpm) to disable the lead switches 63a and 63b from detecting the spool rotation number, is applied to the double-bearing type reel due to the casting operation, the shock sensor 77 transmits its signal to the microcomputer 23.

On the other hand, the hall elements 73a and 73b are structured in the following manner: that is, as shown in FIG. 8, a current can be supplied to the hall elements 73a and 73b from a battery power source 81 through a switch circuit 79 composed of a switching element such as an FET or the like and, at the same time, the magnetic fields of the magnets 65 are respectively applied in a direction at right angles to the direction of a current flowing through the hall elements 73a and 73b; and, when such magnetic fields are applied to the hall elements 73a and 73b each time the spool 1 is rotated, the voltages of the hall elements 73a and 73b generated due to the Hall effect are applied to a pulse generator circuit 83. As a result, the pulse generator circuit 83 outputs a signal proportional to the number of rotations of the spool 1. And, the pulse signal is then input through the input interface 31 into the CPU 25 and is used as the data on the fishing line length measurement within the CPU 25. Also, when the signal from the shock sensor 77 is input to the microcomputer 23, the microcomputer 23 switches on the switch circuit 79 to thereby start the supply of power to the hall elements 73a and 73b.

At the then time, the lead switches 63a and 63b are not able to measure the rotation number of the spool 1. However, if the rotation speed of the spool 1 is lowered down so that the lead switches 63a and 63b are again able to detect the rotation speed of the spool 1, then the microcomputer 23 switches off the switch circuit 79 to thereby stop the power supply to the hall elements 73a and 73b.

By the way, in FIG. 5, reference character 85 designates a level wind mechanism, while 87 stands for a power switch (an on/off switch) which is disposed on the operation panel 37. In addition, a timer 71 shown in FIG. 8 may be applied for another measurement operation method disclosed by Japanese Patent Unexamined Publication No. 4-276510 of Heisei.

As the second embodiment is structured in the above-mentioned manner, in boat fishing, when casting the terminal tackles up to a given shelf position in the sea, the rotation speed of the spool 1 is relatively slow and thus the rotation number of the spool 1 can be detected by the lead switches 63a and 63b. That is, in such low-speed rotation operation, the rotation number N of the spool 1 is detected by the first detect unit 63 and, in accordance with the thus detected-value and the fishing line winding diameter D measured and operated by the ultrasonic sensors 95 and 97, the fishing line length measurement operation is executed.

On the other hand, when the terminal tackles are thrown up to a given fishing point by the casting operation, in some cases, there is a possibility that the rotation speed of the spool 1 is increased too much to be detected by the lead switches 63a and 63b. In this case, if the set acceleration is applied to the double bearing type reel due to the casting operation, then the shock sensor 77 detects the set acceleration and thus transmits a signal to the microcomputer 23. And, on inputting therein the signal from the shock sensor 77, the microcomputer 49 switches on the switch circuit 79 to thereby start the power supply to the hall elements 73a and 73b, which actuates the second detect unit 73 composed of the hall elements 73a, 73b and magnets 65 instead of the lead switches 63a and 63b. As a result of this, a signal, which is output from the pulse generator circuit 83 and is proportional to the rotation number of the spool 1, is input to the CPU 25 through the input interface 31 and is used as the data on the fishing line length measurement within the CPU 25.

And, as described previously, at the then time, the lead switches 63a and 63b are not able to measure the rotation number of the spool 1. However, if the rotation speed of the spool 1 is lowered down so that the lead switches 63a and 63b are again able to detect the rotation speed of the spool 1, then the microcomputer 23 switches off the switch circuit 79 to thereby stop the power supply to the hall elements 73a and 73b.

As has been described the above, according to the second embodiment, the means for detecting the rotation number of the spool 1 includes the first detect unit 63 composed of the lead switches 63a, 63b and magnets 65, and the second detect unit 73 composed of the hall elements 73a, 73b and magnets 65, and, if the rotation number of the spool 1 reaches a given value, then the hall elements 73a and 73b are electrically energized to thereby be able to detect the rotation number of the spool 1. Thanks to this, when compared with the conventional rotation number detect unit which detects the rotation number of the spool while the hall elements are always energized, the power consumption can be reduced to a great extent. Also, when compared with the conventional rotation number detect unit which detects the rotation number of the spool using only the lead switches, the present embodiment is advantageous in that it can detect the rotation number of the spool 1 positively from the low-speed rotation area to the high-speed rotation area.

By the way, although not shown, besides the above-described embodiment using the shock sensor 77, there can also be employed another structure. That is, if the detect range of the lead switches 63a and 63b is less than and equal to about 8000 rpm, then a given spool rotation number, for example, 7000 rpm, is previously stored as a given value in the ROM 27; if the spool rotation number detected by the lead switches 63a and 63b reaches the present given value, then the microcomputer 23 switches on the switch circuit 79 to thereby start the power supply to the hall elements 73a and 73b; and, on the other hand, if the rotation number of the spool 1 is lowered down to or below the given value, then the microcomputer 23 switches off the switch circuit 79 to thereby stop the power supply to the hall elements 73a and 73b.

In this manner, the expected object of the invention can be achieved similarly to the previously described second embodiment.

As has been described heretofore, according to the invention, when compared with the conventional rotation number detect unit which detects the rotation number of the spool while the hall elements are always energized electrically, the power consumption can be reduced to a great extent. Also, when compared with the conventional rotation number detect unit which detects the rotation number of the spool using only the lead switches, the second embodiment is advantageous in that it is able to detect the rotation number of the spool 1 positively from the low-speed rotation area to the high-speed rotation area.

The entire disclosure of each and every foreign patent application from which the benefit of foreign priority has been claimed in the present application is incorporated herein by reference, as if fully set forth.

While only certain embodiments of the invention have been specifically described herein, it will apparent that numerous modification may be made thereto without departing from the spirit and scope of the invention.

What is claimed is:

1. A fishing reel comprising:

a spool rotatably supported to a reel main body;

rotation number detect means detecting the rotation number of the spool, wherein the rotation number detect means comprises:

first detect means having a magnet mounted on a rotary body rotatable in linking with the spool and a lead switch mounted on the reel main body in such a manner as to be located opposed to the magnet, and second detect means having the magnet and a hall element mounted on the reel main body in such a manner as to be located opposed to the magnet, and further wherein, when the rotation speed of the spool calculated on the basis of a measured value of the rotation number detect means exceeds a given value, power supply to the hall element is started to thereby actuate the second detect means.

2. A fishing reel according to claim 1, wherein the rotary body is the spool.

3. A fishing reel according to claim 1, wherein a shock sensor is mounted on the reel main body and the power supply to the hall element is started in accordance with a detect signal output from the shock sensor in a casting operation.

4. A fishing reel according to claim 1, wherein, when a detect value detected by the first detect means exceeds a given value, then power supply to the hall element is started.

* * * * *